Figure 1:
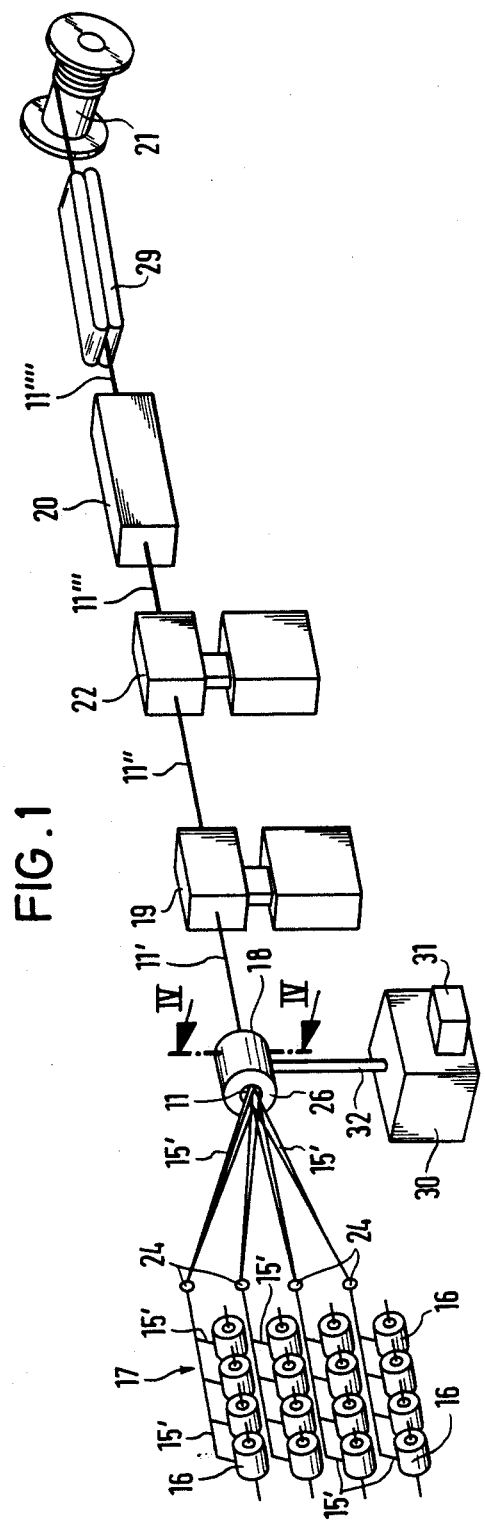

United States Patent [19]

Olesen et al.

[11] Patent Number: 4,956,039
[45] Date of Patent: Sep. 11, 1990

[54] METHOD OF MANUFACTURING A CABLE-LIKE PLASTIC COMPOSITE BODY

[75] Inventors: John Olesen; Jorgen Jorgensen, both of Frederikshavn, Denmark

[73] Assignee: Roblon A/S, Frederikshavn, Denmark

[21] Appl. No.: 192,356

[22] Filed: May 10, 1988

[30] Foreign Application Priority Data

May 11, 1987 [DE] Fed. Rep. of Germany ....... 3715681

[51] Int. Cl.$^5$ .................. B29C 47/02; B32B 17/04; G02B 6/44
[52] U.S. Cl. .................. 156/180; 156/166; 156/244.12; 156/309.6; 264/1.5; 264/174; 427/163; 427/177; 350/96.23; 57/217; 57/221; 57/234
[58] Field of Search ............... 427/163, 177, 117, 120; 156/180, 178, 244.12, 166, 309.6, 51, 55, 56, 179, ; 428/375; 350/96.23; 264/1.5, 174; 118/234; 425/114; 174/121 R, 121 SR; 57/902, 232, 297, 217, 241, 221, 234, 242

[56] References Cited

U.S. PATENT DOCUMENTS

| | | | |
|---|---|---|---|
| 1,957,942 | 5/1934 | Convers | 427/117 |
| 3,822,159 | 7/1974 | Lee et al. | 118/234 X |
| 4,090,902 | 5/1978 | Ferrentino et al. | 156/179 X |
| 4,096,010 | 6/1978 | Parham et al. | 156/179 |
| 4,129,468 | 12/1978 | Knab | 156/244.12 X |
| 4,147,467 | 4/1979 | Eichenbaum et al. | 350/96.23 X |
| 4,185,887 | 1/1980 | Ferrentino | 350/96.23 |
| 4,269,024 | 5/1981 | Ashpole et al. | 264/1.5 X |
| 4,289,558 | 9/1981 | Eichenbaum et al. | 156/180 X |
| 4,312,260 | 1/1982 | Morieras | 174/121 R |
| 4,474,638 | 10/1984 | Einsle | 156/500 X |
| 4,726,750 | 2/1988 | Einsle et al. | 264/65 X |
| 4,781,432 | 11/1988 | Zongor et al. | 350/96.23 |

FOREIGN PATENT DOCUMENTS 3207083 9/1983 Fed. Rep. of Germany.
3214603 10/1983 Fed. Rep. of Germany.
3506673 8/1986 Fed. Rep. of Germany.

OTHER PUBLICATIONS

Shields, J., *Adhesives Handbook*, CRC Press, 1970, pp. 46–48.

*Primary Examiner*—Michael W. Ball
*Assistant Examiner*—Jeff H. Aftergut
*Attorney, Agent, or Firm*—Merchant, Gould, Smith, Edell, Welter & Schmidt

[57] ABSTRACT

A cable-like synthetic composite body which can be used as a support element for technical cables comprises a string of endless filaments of high modulus of elasticity which extend parallel to one another and to the cable axis, with the string being impregnated with a first thermoplastic material (12) in the form of a hot melt adhesive. The string (11') which is held together in this way is then sleeved by extrusion with the second thermoplastic material (13) which is filled with staple fibers (23) of a high modulus of elasticity. A sleeve of a third thermoplastic material (14) is then applied by means of extrusion onto the sleeve layer.

10 Claims, 3 Drawing Sheets

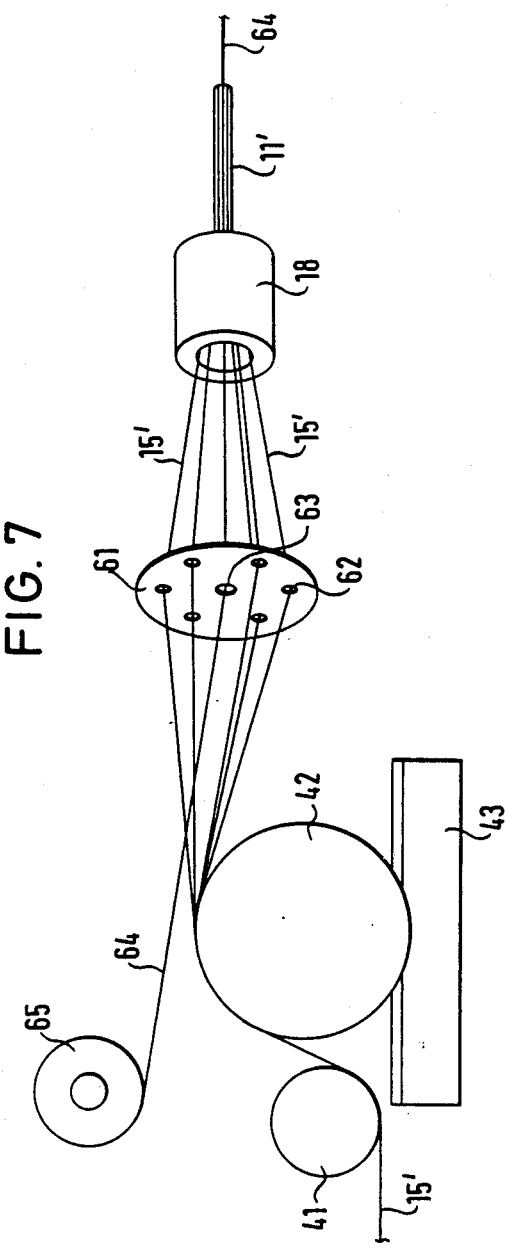
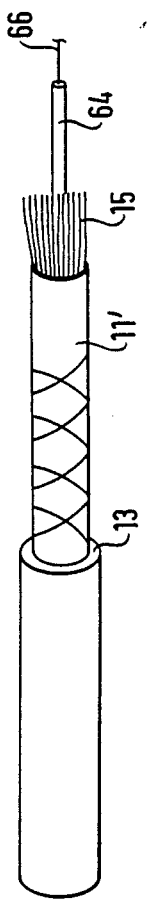
FIG. 7
FIG. 8

METHOD OF MANUFACTURING A CABLE-LIKE PLASTIC COMPOSITE BODY

The invention relates to a method of manufacturing a cable-like plastic composite body in which a string of endless filaments of high modulus of elasticity which are gathered together and extend parallel to one another and to the cable axis is impregnated with a liquid, solidifiable plastic and the plastic is subsequently solidified, and also to an apparatus for carrying out the method and to a cable-like plastic composite body.

Such synthetic composite bodies are used in technology as support elements for cables, in particular for optical waveguide cables, such as optical fiber cables. They are widely used in cable technology and are mainly used in rod form as a central core or as armouring in cables (sea-cables, communication cables, air cables etc.). Other applications are also known. Such synthetic composite bodies can for example also be used as armouring in other structures, for example in concrete in bridge building.

It is important, in particular when using the composite body as a support element or an optical waveguide cable, however also when using the composite body as armouring in concrete structures and in other fields, that the composite body is able to accommodate both tensile stresses and also compressive stresses, in particular stresses which are directed in the axial direction, without excessive extension or compression of the composite body occurring. From this point of view it is desirable that the composite body behaves approximately as an iron rod.

By way of example an in optical waveguide cables individual glass filament which transmits the light is inserted into a thin tube or cannula which is with petrolatum. In the normal state the optical fibers have a length which is fractionally larger than that of the tubes so that the fibers extend in slightly wave-like manner through the tubes. In this way a certain degree of extension of the tube, for example as a result of tensile stresses or temperature fluctuations, can be tolerated without longitudinal loadings of the optical fibers arising which could lead to breakage of the fibers. Under compressive stresses, which predominantly arise as a result of temperature fluctuations, the tubes tend to shrink more than the glass fibers. This excessive shrinkage of the tube then leads to the optical fibers extending in a more pronounced waveform within the tubes so that they contact the inner side of the tubes at least point-wise. This results in a very high optical attenuation which is undesired since the signal strength reduces. A preferred practical application of a cable-like synthetic composite body of the present species is the prevention of this excessive shrinkage of the tubes. This is achieved by arranging the tubes around the cable-like synthetic composite body and securing them to it, which can for example be done by means of an adhesive (preferably of a hot melt adhesive).

In the prior art the cable-like synthetic composite body has a core string consisting of endless filaments which are embedded by pultrusion into a matrix of a duroplastic plastic, i.e. of a synthetic material which can be cured by heat. This core string is then surrounded by a winding or two crossed windings of a yarn which cause depressions and raised portions at the boundary between the core string and the yarn which ensure a form-locked connection with the core string. This winding, or these windings, is, or are, then mainly provided with a sleeve layer of a thermoplastic material in order to form the finished synthetic composite body. This sleeve layer, which is frequently applied later during the manufacture of the actual cable is likewise connected as a result of the depressions and raised portions of the winding or windings with the latter, so that tensile or compressive forces acting on the sleeve layer can be transmitted via the form-locked connection to the core string, with essentially only the core string contributing to the tensile strength of the composite body. When used as a support element for an optical waveguide cable the sleeve layer serves to thicken the core string and can be applied in various diameters in order to make available support elements of different diameters for the subsequent cable manufacture. When using the known composite body as armouring for concrete structures the sleeve layer can be dispensed with.

The manufacture of the core string takes place by means of so-called pultrusion and the requirement to cure the thermosetting plastic (duroplastic) by means of heat leads, with a reasonable length for the plant, to a relatively low manufacturing speed of approximately 4 m/min. As a result of the low speed of manufacture the product is relatively expensive. Moreover, heat curable duroplastics always contain solvents which are to be regarded as noxious materials and are poisonous for human beings. It is thus necessary to go to great expense to keep the volatile solvents away from the environment, or to recover them.

As duroplasts have a relatively high stiffness the composite body also has a relatively high bending strength. This is admittedly desirable from some points of view, however, it leads to certain difficulties when handling the composite body or the finished cable since the composite body tends to spring away from the coil and it is relatively difficult to bend the cable itself around relatively small radii. Thus the installation of the cable is made unnecessarily difficult for certain applications. Nevertheless the known composite body has a good resistance against kinking as a result of the high bending stiffness which is desirable, in particular with optical waveguide cables.

The principal object underlying the present invention is to provide a method or an apparatus for the economical manufacture of a cable-like synthetic composite body which satisfies the requirements of being able to bear relatively high tensile and compressive forces in every respect, which has adequate bending stiffness and a good resistance to kinking, but which is nevertheless easy to handle during further processing, and in particular also permits small bending radii, and which can moreover be produced in an environmentally friendly manufacturing process and does not represent any danger for the environment in later use.

In order to satisfy this object the invention provides that the string is impregnated with a first thermoplastic plastic which can be made liquid by heating; and that the string impregnated with the thermoplastic plastic is sleeved by extrusion with a second thermoplastic plastic which is preferably filled with reinforcement elements having a high modulus of elasticity, in particular staple fibers, with sufficient heat being supplied to the first thermoplastic plastic during extrusion that an intimate bond of the first thermoplastic plastic to the second thermoplastic plastic is generated.

The fact that the first plastic surrounding the endless filaments is a thermoplastic avoids the need to operate with environmentally noxious solvents such as styrol. Since such thermoplastic synthetic materials are less stiff than the previously used thermosetting plastics, and are thus more readily deformed in cross-section under bending loads, the core string is sleeved in accordance with the invention, with the second, filled, thermoplastic material, which takes place by extrusion. During the extrusion step which takes place at elevated temperature at least the surface of the first thermoplastic synthetic material is made tacky or adhesive by heating and then enters into an intimate bond with the second thermoplastic plastic as a result of the fibers contained in the second thermoplastic material which partially penetrate into the desired first thermoplastic synthetic material, so that the tensile and pressure forces acting on the sleeve are transmitted to the core string.

At the same time the sleeve for the core string forms, as a result of the fiber filling, a type of tube around the core string which counteracts the deformation of the core string under bending loads, and in particular prevents the formation of a locally oval cross-section of this core string under bending loads, so that the danger of kinking is substantially reduced. Although adequate stiffness is present the composite body does not spring back as greatly as in the prior art, so that the handling of the cable is facilitated. The composite body is absolutely watertight and can thus not be destroyed by the penetration of water so that the composite body can therefore also be used at temperatures below zero.

The fact that the second thermoplastic plastic is likewise a thermoplastic and does not contain any environmentally poisonous solvents ensures that the composite body can be made on and behaves in an environmentally friendly manner. Since, for many of the sleeve layer of the second thermoplastic synthetic material to cool the cable-like composite body, which can take place relatively quickly by means of a suitable cooling device, for example a channel through which water flows, it is possible to substantially increase the manufacturing speed. It is indeed straightforwardly possible to reach a speed of 100 m/min., without having to tolerate an excessive length of the plant.

In a particularly preferred embodiment of the method the string formed through the first extrusion is sleeved with a third thermoplastic synthetic material by a second extrusion. This third thermoplastic synthetic material serves not only as a type of thickening, so that the outer diameter of the composite body can be made as large as desired, it also serves to introduce bending forces in a distributed manner into the core string, i.e. to stiffen the end structure, so that the danger of kinking is further reduced. A high quality transmission of axially directed tensile and compressive forces to the core string, or to the sleeve layer of the second thermoplastic plastic is ensured by the rough surface (microscopically considered) of the second thermoplastic synthetic material, which results from the random orientated reinforcement fibers.

The fact that the third thermoplastic synthetic material is also applied in the hot state by means of extrusion to the previously formed string leads furthermore to a good bond between the second and third thermoplastic synthetic materials. No noxious substances arise during the application of the third thermoplastic material.

The endless filaments consist, in accordance with the invention, preferably of E-glass (aluminoborosilicate glass), S-glass (magnisium aluminosilicate), aramid, or carbon. The first thermoplastic plastic is preferably hot melt adhesive, for example a hot melt adhesive based on ethylene vinyl acetate, polyester, polyamide, polypropylene or polyester.

The second thermoplastic plastic for the sleeve layer for the core string is preferably filled with staple fibers of glass, aramid or carbon and comprises in particular polypropylene with E-glass staple fibers which are chemically coupled to the polypropylene, for example by means of a primer.

The degree of filling of the second thermoplastic synthetic material with the reinforcing fibers amounts to from 10 to 80%, in particular to from 10 to 30% and preferably to approximately 20%. The third thermoplastic synthetic material preferably consists of polyester, polyethylene, polyamide, polypropylene, polyvinyl chloride, polytetrafluoroethylene, polyurethane or of a mixture of at least two of these substances. The third thermoplastic plastic is preferably polyethylene.

An apparatus for carrying out the method of the invention is characterised by (a) a spool carrier arrangement having a plurality of endless filament spools, (b) a string impregnating device to which the endless filaments which have been gathered into a string are supplied, and from which a string impregnated with the first thermoplastic plastic emerges, (c) an extruder into which the impregnated string enters and out of which a string sleeved with the filled second thermoplastic plastic emerges, (d) a cooling device through which the sleeved string is passed, and (e) a coiling device to receive the cooled and finished string in the form of a winding.

In one preferred embodiment of the apparatus the string impregnation device comprises a nozzle with a funnel-like through-flow channel tapering in the direction of movement of the string for the endless filaments which are gathered together in the nozzle to form the string, and a metering pump which feeds the liquid adhesive from a supply vessel through a line into the through-flow channel, preferably a gear pump, which delivers the hot melt adhesive in the desired ratio quantity-wise to the through-running speed of the endless filaments. Moreover, a driven drawing device formed by two conveyor bands is preferably provided for pulling the string through the apparatus and is in particular arranged after the cooling device and before the coiling device.

For the manufacture of cable-like synthetic composite bodies with an outer sleeve of the third thermoplastic material the apparatus is further characterised in that a second extruder, in which the string sleeved with the second thermoplastic material is sleeved with a third thermoplastic material, is inserted between the first extruder and the cooling device.

The extruders used for the apparatus of the invention are known per se and are preferably formed as so-called cross-head extruders in which the screw of the extruder is arranged transversely to the direction of conveyance of the string, i.e. to the longitudinal axis of the composite body. The cooling device can be formed as an open channel or as a closed duct through which cooling water flows. The entire apparatus is thus composed of inexpensive modules and no particular measures are required in order to avoid environmental damage, since the particular construction of the composite body to be manufactured and the substances used for this do not cause environmental damage.

By means of the method or apparatus of the invention it is possible to manufacture a cable-like synthetic composite body having a core string comprising endless filaments which extend parallel to one another and to the cable axis and a first plastic arranged between them in the form of an impregnation, the composite body being characterised in that the first plastic is a thermoplastic plastic, in particular a hot melt adhesive, and in that the core string is surrounded by a sleeve layer applied thereto by extrusion and comprising a second thermoplastic plastic filled with fibers having a high modulus of elasticity.

When using the synthetic composite body as a cable support element the sleeve layer of the filled second thermoplastic material is preferably surrounded by the sleeve of the third thermoplastic material.

Particularly advantageous is a composite body which is characterised in that the string of endless filaments is formed by bundles of E-glass filaments (i.e. filaments of an aluminoborosilicate glass) with a filament thickness of 5 to 20 $\mu$, in particular 14 to 15 $\mu$, with each bundle having 300 to 1400 Tex (g/1000 m), in particular approximately 1200 Tex; in that the first thermoplastic plastic is a hot melt adhesive based on ethylene vinyl acetate; in that the second thermoplastic plastic is polypropylene with 20% E-glass staple fibers, and optionally in that the third thermoplastic plastic comprises polyethylene.

A composite body of this kind can be manufactured economically.

The present invention also relates to the manufacture of a composite body suitable for use as a cable core with absolute watertightness along its full length. The invention is also directed to apparatus for carrying out these methods.

Figure 4:
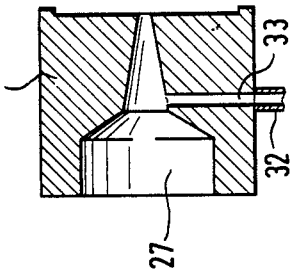
Figure 3:
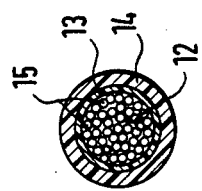
Figure 2:
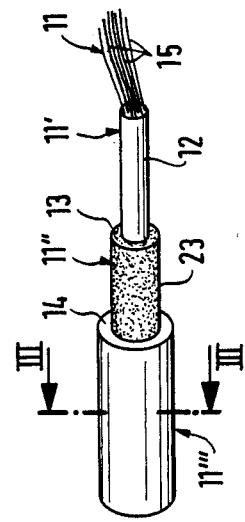

Methods and apparatus in accordance with the invention will now be more closely described in the following by way of example only with reference to the drawings which show:

FIG. 1 a schematic perspective illustration of an apparatus for manufacturing the composite body of the invention, FIG. 2 a schematic perspective illustration of the build-up of the cable-like synthetic composite body, with the individual layers being partly cut-away for the sake of clarity, FIG. 3 a cross-section through the cable-like synthetic composite body in accordance with the arrows III—III of FIG. 2, FIG. 4 a longitudinal section in accordance with arrows IV—IV of FIG. 1 in order to show a detail of the string impregnating device that is used.

Figure 5:
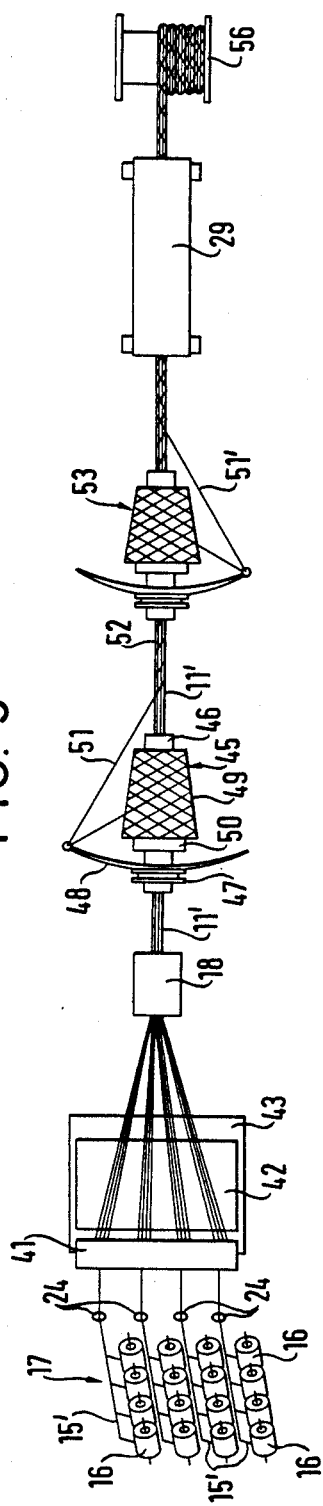
Figure 6:
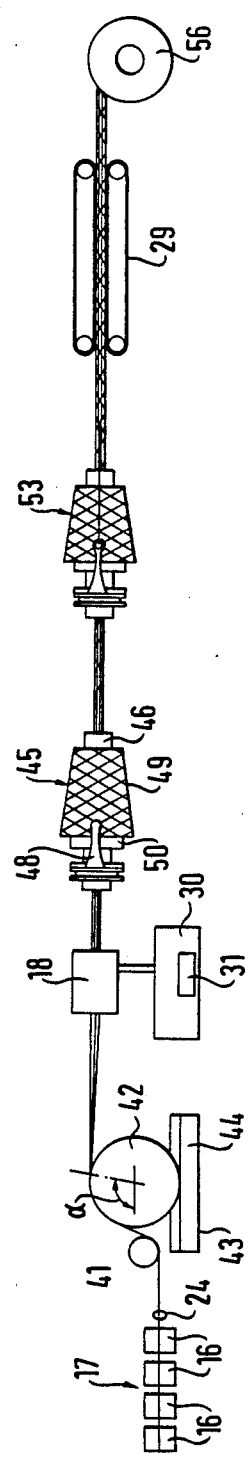

FIG. 5 a plan view of a plant for producing a core string which is particularly suitable for use in optical cables, FIG. 6 a sideview of the plant of FIG. 5, FIG. 7 a schematic illustration of a part of a plant for producing an optical fiber cable particularly suited for use as a drop line, and FIG. 8 a broken away perspective view of an optical fiber drop line cable manufactured using the plant of FIG. 7.

At the start of the apparatus of FIG. 1 there is located a spool carrier arrangement 17 in the form of a delivery frame with a plurality of reels 16 which are rotatably arranged on spigots. Each individual reel 16 carries a bundle of filaments (which can consist of several hundred filaments) and is braked in order to keep the take-off of the filaments uniform. The individual filaments of the filament bundle are wound during the manufacturing process of the filaments without adhesive or other securing or binding agents onto the reel 16. The drawing shows four rows arranged above one another and each consisting of four reels 16. The four filament bundles 15' located on the reels 16 of each row are drawn through a guide 24 and are led from this guide to the input of the nozzle 26 of a string impregnation device in order to form a string 11. In the drawing there are thus a total of 16 reels, many more or fewer can however also be provided depending on how many filaments as a whole are required and how many filaments belong to each bundle.

The nozzle 26 which is shown in detail in a longitudinal section in FIG. 4 serves for the application of the hot melt adhesive which is kept ready in the liquid state in a container 30 and is pressed by means of a dispensing pump 31 in the form of a motor-driven gear pump through the line 32 in metered quantities. As shown in FIG. 4 the nozzle 26 has a funnel-like channel 27 which is of circular cross-section. The bundles 15' run through the funnel and are simultaneously impregnated with the hot melt adhesive which flows through the line 32 and the bore 33, with the individual endless filaments 15 extending parallel to one another and to the longitudinal axis of the string 11 at the output of the nozzle in order to ensure the desired extendability and compressability of the finished composite body. The endless filaments impregnated with hot melt adhesive thus form the so-called core string 11'.

With reference to the example of a cable-like synthetic composite body with 3 mm cross-section of the core string 11' ten such bundles are combined with each bundle having 1200 Tex (g/1000 m) and being composed of individual filaments with a diameter in the region from 14 to 15 $\mu$. These filaments are high module fibers, i.e. fibers with a high modulus of elasticity and consist in the present example of E-glass. When using ten bundles 15' the string 11 so formed thus has a weight of 12 g/m.

The absolute speed of the core string 11' emerging from the nozzle 26 and the supply speed of the dispensing pump 31 are so matched to one another that the conveyed hot melt adhesive fully bonds to the string 11, so that no excess of melt adhesive is lost or has to be returned to the container.

The liquid hot melt adhesive in the string impregnation device 18 is an Esso hot melt adhesive on ethylene vinyl acetate basis of the type JU 2514 which is kept liquid at a temperature of 190° C. and has a low viscosity at this temperature, so that it can flow between the endless filaments.

The core string 11' impregnated with the hot melt adhesive emerges from the string impregnation device 18, or from its nozzle 26, with a weight of 13.5 g/m. The relatively low increase in weight indicates that relatively little hot melt adhesive is contained in the core string, in other words, that the degree of filling of the core string with the high module fibers is very high. The core string 11' cools rapidly in the environmental air, so that the hot melt adhesive already has a certain strength after leaving the string impregnation device 18. The core string 11' then runs into a first extruder 19, with the distance between the string impregnation device 18 and the first extruder 19 amounting to 4 m.

The first extruder 19 is formed as a so-called crosshead extruder which is known for the coating of a string with a sleeve of synthetic material. The first extruder 19 serves to apply a sleeve layer of a second thermoplastic material 13 filled with short reinforcement elements 23 such as staple fibers of glass, to the core string. The second thermoplastic material can be a glass fiber filled polypropylene of the Hoechst type PPN 7790 GV2/20, i.e. polypropylene filled with 20% E-glass staple fibers which are chemically coupled to the polypropylene. This thermoplastic material is brought in the extruder 19 to a temperature of 240° C. and in this manner heats the surface of the hot melt adhesive lying beneath it, so that the latter is reactivated, i.e. becomes adhesive, with an intimate bond being generated between the first thermoplastic material of the hot melt adhesive and the second thermoplastic material 13 of the sleeve layer. This bond is made stronger by the staple fiber filling of the second thermoplastic material, since individual fibers of the quasi randomly distributed staple fibers bridge the boundary layer between the two thermoplastic materials, and thus ensure that compressive and tensile forces can be transmitted from the sleeve layer of second plastic 13 to the core string 11'. On leaving the first extruder the now formed string 11" with sleeve layer has a diameter of 4 mm and a weight of 17.5 g/m, i.e. a weight increase relative to the core string 11' of 4 g/m.

The string 11" then leads, after cooling in the environmental air, into a second extruder 22 which is arranged at a distance of 1.5 m from the first extruder 19. A sleeve of a third thermoplastic material 14 is applied to the sleeve layer of the second plastic 13 of the string 11" and consists in the present example of polyethylene from the company Neste type DFDS 1169. In the extruder 22 this polyethylene reaches a temperature as it is applied to the string 11" of 190°. After the second extruder the string then has a diameter of 6 mm and a weight of 34 g/m, i.e. an increase in weight of 16.5 g/m relative to the string 11".

The so formed string 11''' is then drawn by means of the driven drawing device 29 through a cooling device 20 in the form of an open channel of 30 m length, with cooling water flowing at a temperature of approximately 20° C. through the channel in order to cool the string to the environmental temperature. In order to save water it is recirculated by means of a pump through the intermediary of a storage container.

The driven drawing device consists of two recirculating conveyor bands which form an entry gap and which run in opposite directions so that the lower run of the upper conveyor belt and the upper run of the lower conveyor belt run in the same direction. With this drawing device the string 11'''', and thus also the endless filaments are pulled at a constant speed of 100 m/min. through the apparatus.

The finished string 11'''' is then coiled into the reel 21. This reel 21 is so driven that the string 11'''' is reeled with constant tension onto the reel. A drive of this kind can be realised in relatively simple manner.

A further embodiment of the invention is shown in FIGS. 5 and 6 in which parts common to the earlier figures are identified by the same reference numerals.

The object of the plant of FIGS. 5 and 6 is to provide a core string 11' with a high density of high modulus fibers, and in which hot melt adhesive is present in all interstices between individual high modulus fibers so that absolute watertightness of the core string 11' can be guaranteed. This is sometimes difficult to obtain with the string impregnation device 18 of FIGS. 1 and 4.

Once again the endless high modulus filaments are drawn from a plurality of reels 16 provided on a spool carrier arrangement 17. The spool carrier arrangement 17, the spools and also the filaments wound thereon can, and preferably are, precisely the same as those described with reference to FIG. 1. The four filament bundles 15' located on the reels 16 of each row are again drawn through a respective guide 24 but instead of passing directly to the extruder nozzle 18 they now first pass beneath a roller 41 and over the surface of a drum roller 42.

The drum roller 42 is mounted so that its lower portion runs through a tank 43 containing the same hot melt adhesive as was supplied to the string impregnation device 18 of FIG. 1. The drum roller 42 is heated to the same temperature as the molten hot melt adhesive 44 in the tank 43 (190° C. for the Esso hot melt adhesive on ethylene vinyl acetate basis of the type JU 2514) so that a thin film of molten hot melt adhesive forms on the surface of the drum roller 42. The individual filaments of the individual filament bundles 15' are brought into intimate contact with the film of hot melt adhesive on the surface of the drum roller 42 as a result of the position of the roller 41, which causes the filaments to wrap around the drum over an angular extent $\alpha$. The wrap angle $\alpha$ (FIG. 6) can be varied by varying the position of the roller 41 relative to the drum roller 42 and also by varying the position of the extruder 18 relative to the drum roller 42.

Because of the tension in the filaments the individual filament bundles tend to flatten out on the surface of the drum, as can be seen from FIG. 5, and this ensures that each thin filament comes into contact with the thin film of hot melt adhesive on the surface of the drum. Furthermore, the drum roller 42 is driven with a surface speed slightly less than the linear speed of the individual high modulus fibers in the direction of the core string 11' so that a certain degree of slip occurs between the individual fibers and the surface of the drum. This slippage beneficially affects the coating of the individual fibers with the hot melt adhesive.

On leaving the drum roller 42 the individual fibers pass once again into a string impregnation device 18 which can be constructed precisely in the same manner as was described with reference to FIG. 1. The only difference now is that the dispensing pump 31 is set to deliver smaller quantities of hot melt adhesive via the line 32, since some of the hot melt adhesive is already supplied via the drum roller 42. The core string 11' emerging from the string impregnation device 18 of FIG. 5 can either be passed directly into the cross-head extruder 19 of FIG. 1, from which it subsequently passes into the cross-head extruder 22 (optionally present) into the cooling device 20 and then through the caterpillar drawing device 29 prior to being wound onto a spool 21.

However, it is anticipated that many cable manufacturers would like to be supplied with a core string 11' so that they may build the core string up themselves in accordance with their requirements. This poses a certain problem since the core string 11' is not at all resistant to kinking, since the sleeve layer 13 is missing. The Applicants have however made the surprising discovery that it is possible to protect the core string against kinking by winding it with a helical outer thread which is achieved using the winding apparatus 45 of FIG. 5.

This winding apparatus comprises a hollow axle 46 through which the core string 11' is free to slide with the hollow axle 46 being supported at its two ends in bearings in a stand (not shown). The axle is driven via a pulley 47 using a V-belt and a motor which, for the sake of simplicity, are not shown here. It will be understood that the motor is arranged inside the stand for the axle beneath the winding device 45 in FIG. 6.

A flyer 48 is mounted on the pulley and has two arms one of which forms a guide for the winding yarn and the other of which forms a counter-weight to keep assembly dynamically balanced.

A cross-wound spool package 49 of endless polyester filaments is mounted on the hollow axle 46 and is rotatable relative thereto. A friction clutch 50 is however provided between the cross-wound package 49 and the axle 46 to prevent overrunning of the package and tangling of the polyester filaments. The polyester filaments 51 wound on the package typically comprise 50 individual endless polyester filaments each of 5 D.Tex, i.e. the polyester filament yarn used for winding around the core string has a total weight of 250 D.Tex.

In operation the motor drives the flyer via the V-belt and pulley arrangement and the flyer draws yarn 51 from the package and winds it helically around the core string 11' as illustrated at 52. A second winding device 53 can be provided downstream of the first winding device 45 and can be used to cross-wind the core string 11' with a second polyester yarn 51' identical to that used for the winding device 45. It will be appreciated that to achieve the cross-winding the winding device 53 is rotated in the opposite direction to the winding device 45. Since the winding takes place whilst the hot melt adhesive used to impregnate the core string 11' is still soft, the winding yarn is reliably retained on the surface of the core string 11'. It has been found that this simple act of winding the core string has a beneficial effect on preventing the cross-section of the core string becoming oval when subjected to potential kinking loads, so that improved protection against kinking is present.

It should be noted that although the winding indeed of a core string, and also cross-winding of a core string, is known per se in connection with the prior art filaments the winding there took place for a completely different purpose. In the prior art the windings have no effect on the resistance of the core string to kinking since the core string is impregnated with a rigid thermosetting plastic or resin which is so hard that kinking does not occur. On the contrary, the core string of the prior art is liable to brittle fracture if subjected to loads which would ordinarily produce kinking. The winding of the core string in the prior art was done solely to provide a mechanical anchorage for a sleeve layer subsequently applied thereto.

On leaving the winding device 45, or also the further winding device 53, if such is provided, the core string then again passes through a caterpillar drawing device 29 and is wound onto drums such as 56.

The process described with reference to FIGS. 5 and 6 is not as fast as the process described with reference to FIG. 1. Experiments presently show that it is possible to drive the process of FIGS. 5 and 6 at a linear speed of the core string of up to 20 m/min. The apparatus of FIG. 1 can however be driven at speeds of up to 100 m/min. In view of this, and, assuming that the core string 11' produced by the plant of FIGS. 5 and 6 is to be further treated in the cross-head extruder 19 (and optionally in the cross-head extruder 22 with subsequent cooling in the water channel 20), it is desirable to provide say five installations of the type shown in FIGS. 5 and 6 so that the total production of these five installations is again 100 m/min. of core string, which is sufficient to run the plant of FIG. 1 continuously. Although the production rate of the plant of FIGS. 5 and 6 is reduced relative to that of FIG. 1 the core string is of a higher quality since absolute watertightness of the core is guaranteed. Moreover, the speed of production of the plant of FIGS. 5 and 6 is four or five times greater than the speed of production of the plants used to produce the known cable cores with thermosetting material.

The reason for this is to be found not only in the difference in material but also in the different process approaches. In the prior art the endless filaments are impregnated with the thermosetting plastic material in the cold state and heat is then applied to cure the thermosetting plastic at elevated temperature which takes a relatively long time. In the present invention the impregnation of the fibers takes place at an elevated temperature and the hot melt adhesive starts to cool immediately it leaves the extruder 18. Moreover, further processes can be carried out on the cable core (winding, cross-winding) while the core is still hot, or at least warm, without disadvantage.

The plant of the present invention, i.e. also of FIGS. 5 and 6, is substantially more economical than the plant used for the prior art cable cores. The plant used for prior art cable cores is not only much slower, as explained above, but it also requires extensive solvent capture and reprocessing equipment to protect the environment. It also needs a lot of thermal energy for the curing of the thermosetting plastic material. As explained above the hot melt adhesive and thermoplastics used for the present invention do not involve solvents and the manufacturing process involves only relatively small quantities of energy.

Although the core strings and coated core strings previously described are principally used as support cores for large optical cables, they can also be used for the production of optical fiber cables suitable for use as drop lines, and for local connections between apparatus handling optical signals.

An apparatus for producing such a drop line cable is illustrated in FIG. 7. Again, common reference numerals are used to indicate parts of the apparatus of FIG. 7 which have already been described earlier. As seen in FIG. 7 the endless filaments 15' again pass beneath a roller 41 and then over the surface of a heated drum roller 42, which once again bears a thin layer of a molten hot melt adhesive drawn from the tank 43.

Instead of passing directly into the extruding head 18 the endless filament bundles 15' first pass through a die plate 61 having a plurality of guide holes equidistantly distributed around its central opening 63. A plastic, preferably thermoplastic, tube 64 containing an optical transmission fiber is drawn from a supply reel 65 and passes through the central orifice 63 of the die-plate 61 so that on emergence from the extruder head 18 the tube 64 is located at the center of the core string 11. The core string 11' can be bound in the manner previously described and can subsequently be sleeved with a thermoplastic sleeving layer (optionally with or without staple fiber filling), to produce the cable shown in section in FIG. 8.

The sleeving of the wound (or unwound) core string 11' can of course take place in the cross-head extruder 19 of the plant of FIG. 1. The materials used for the sleeve are the same as those previously described with reference to the other embodiments. Thus the build-up of the drop line cable of FIG. 8 comprises at the very center the optical fiber 66 within its support tube 64, with the tube 64 lying coaxially within the core string 11'. The core string 11' is again reinforced against kinking by cross-wound polyester filament yarns as described in connection with FIGS. 5 and 6, and a first thermoplastic sleeving layer 13 is disposed concentrically around the cross-wound core string 11'.

A cable of this kind has substantial strength and resistance to damage and can for example be laid in a building during the building stage, without being susceptible to damage through rough treatment such as can occur on building sites. This is particularly the case when the sleeve layer 13 is reinforced with high modulus staple fibers and covered with a further protective sleeve 14 (not shown in FIG. 8).

We claim:

1. A method of manufacturing a high strength cable-like plastic composite support body resistant to kinking, said support body having a longitudinal axis, the method comprising the stops of gathering together a plurality of substantially endless filaments of high modulus of elasticity into a core string so that said filaments in said core string extend parallel to one another in the direction of said longitudinal axis, impregnating said core string throughout its length with a hot melt adhesive which can be made liquid by heating and winding said core string impregnated with said hot melt adhesive with a high strength yarn while said hot melt adhesive is in a soft state to form a wound core string.

2. A method in accordance with claim 1, wherein said wound core string is cross-wound with a second high strength yarn (51).

3. A method in accordance with claim 1, wherein said substantially endless filaments are passed over a surface of a heated rotating drum (42) carrying a film of liquid hot melt adhesive (44) in order to wet the filaments with adhesive on all sides to ensure complete watertightness of said cable-like plastic composite body.

4. A method in accordance with claim 3, wherein said substantially endless filaments are passed at a linear speed, and wherein said heated drum (42) rotates with a surface speed slightly different from the linear speed of said core string (11') whereby a degree of slippage occurs between the core string (11') and the surface of said heated drum (42).

5. A method of manufacturing a cable-like plastic composite body having a longitudinal axis, in which a core string of substantially endless filaments of high modulus of elasticity which are gathered together and extend parallel to one another and to said longitudinal axis is impregnated with a liquid, solidifiable plastic and the plastic is subsequently solidified, characterized in that the core string is impregnated with a hot melt adhesive which can be made liquid by heating; and the core string impregnated with the hot melt adhesive is wound with a high strength yarn while said hot melt adhesive is still soft, and wherein said substantially endless filaments are passed over a surface of a heated rotating drum carrying a film of liquid hot melt adhesive in order to wet the filaments with adhesive on all sides to ensure complete watertightness of said cable-like plastic composite body, and wherein said substantially endless filaments coated with hot melt adhesive are gathered together on leaving said heated drum and are passed through an extruding device to form said core string impregnated with said hot melt adhesive.

6. A method in accordance with claim 5, wherein said substantially endless high modulus filaments are gathered together into bundles and pass through apertures (62) in a die plate (61) positioned between said heated drum (42) and said extruding device (18); and in that said die plate has a central opening (63) through which a tube (64) containing an optical fiber (66) is drawn, whereby said tube (64) becomes substantially concentrically embedded in said core string (11').

7. A method in accordance with claim 6, wherein said tube containing said optical fiber is drawn from a supply reel (65) which is preferably positioned so that said optical tube (64) does not pass over said heated drum (42).

8. A method in accordance with claim 7, wherein said core string (11') containing said optical fiber (66) is subsequently sleeved with a further thermal plastic material (13), preferably in a cross-head extruder (19) and preferably, after being wound with high strength yarn (51, 51') to improve kink resistance of said core string (11') when said core string is curved around a given radius.

9. A method of manufacturing a cable-like plastic composite body having a longitudinal axis, in which a core string of substantially endless filaments of high modulus of elasticity which are gathered together and extend parallel to one another and to said longitudinal axis is impregnated with a liquid, solidifiable plastic and the plastic is subsequently solidified, characterized in that the core string is impregnated with a hot melt adhesive which can be made liquid by heating; and the core string impregnated with the hot melt adhesive is wound with a high strength yarn while said hot melt adhesive is still soft, and wherein said filaments are passed over a surface of a heated rotating drum carrying a film of liquid hot melt adhesive in order to wet the filaments with adhesive on all sides to ensure complete watertightness of said cable-like plastic composite body, and wherein said filaments pass beneath a roller prior to contacting the surface of said heated drum.

10. A method in accordance with claim 9, wherein said substantially endless filaments are passed over the surface of said heated drum through an angle of wrap, and wherein said roller can be variably positioned relative to said heated drum (42) so as to vary the angle of wrap of the filaments around the surface of said heated drum.

* * * * *

UNITED STATES PATENT AND TRADEMARK OFFICE
CERTIFICATE OF CORRECTION

PATENT NO.   :   4,956,039

DATED        :   11 September 1990

INVENTOR(S)  :   John Olesen, Jorgen Jorgensen

It is certified that error appears in the above-identified patent and that said Letters Patent is hereby corrected as shown below:

Column 1, line 34, delete "ᴏ" and insert --By--; and delete "example an in" and insert --example, in--.

Column 1, line 35, delete "ndividual" and insert --each individual--.

Column 1, line 36, delete "- s" and insert --signals--.

Column 1, line 37, before "with" insert --filled--.

Column 3, line 33, delete "on" and insert --in--.

Column 3, line 34, after "many" insert --purposes, it is merely necessary after the application--.

Signed and Sealed this

Seventh Day of April, 1992

Attest:

HARRY F. MANBECK, JR.

*Attesting Officer*        *Commissioner of Patents and Trademarks*